Feb. 22, 1966  L. H. BISHOP  3,236,129
APPARATUS FOR CONTROLLED PENETRATION SLITTING
Filed Oct. 23, 1963  2 Sheets-Sheet 1
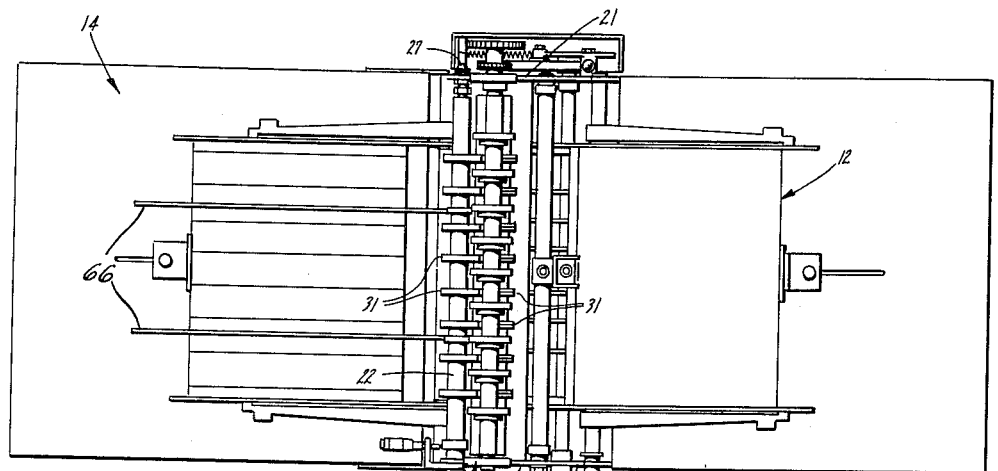
Fig. 2
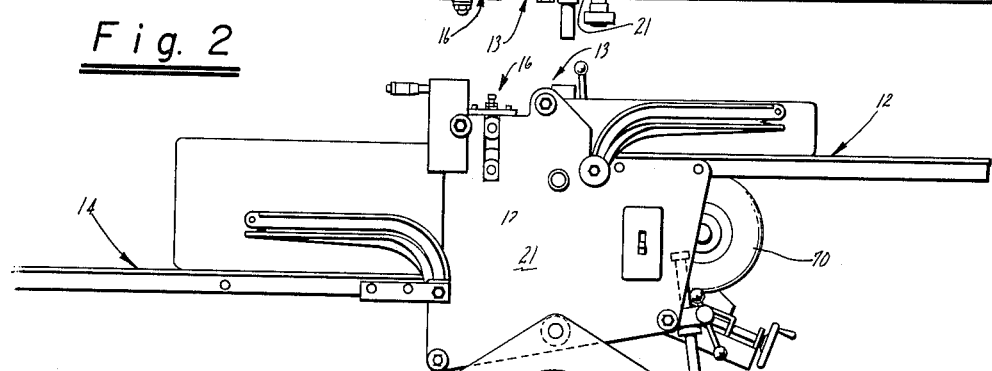
Fig. 1
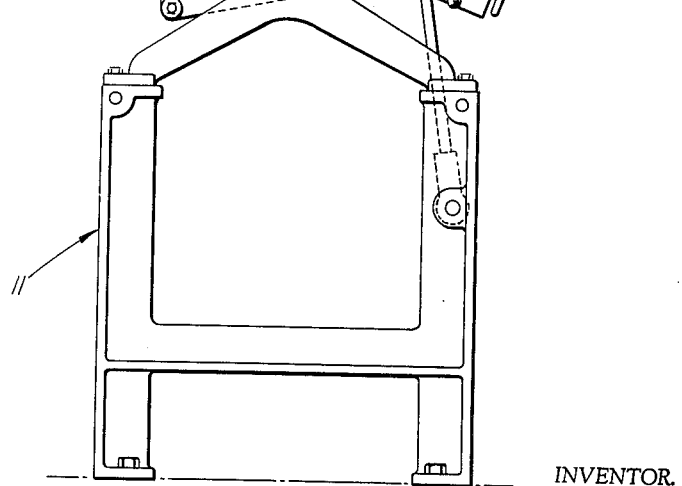
INVENTOR.
Lewis H. Bishop
BY
Attorneys

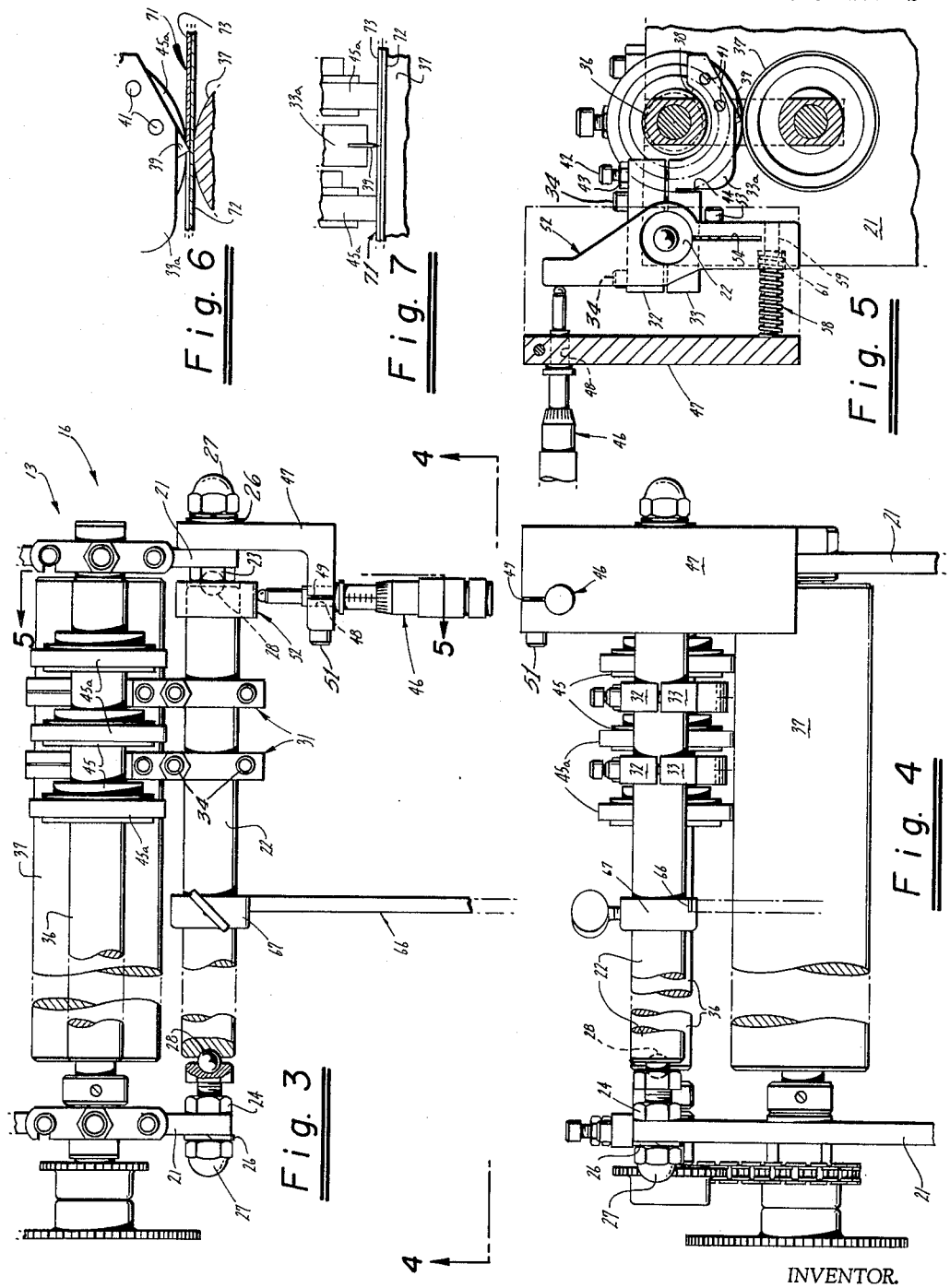

United States Patent Office 3,236,129
Patented Feb. 22, 1966

3,236,129
APPARATUS FOR CONTROLLED PENETRATION SLITTING
Lewis H. Bishop, Burlingame, Calif., assignor to Pierce Specialized Equipment Co., San Mateo, Calif., a corporation of California
Filed Oct. 23, 1963, Ser. No. 318,332
7 Claims. (Cl. 83—6)

This invention relates to apparatus for controlled penetration slitting.

In my copending application Serial No. 857,993, filed December 7, 1959, now U.S. Patent No. 3,122,040 there is disclosed a machine for perforating, scoring and slicing. Other machines have also been provided for perforating, scoring and slicing. However, with such machines, it has been difficult to perform controlled penetration slitting as, for example, the slitting of backing on pressure sensitive placards, labels, bumper strips and the like without cutting the facing material itself. There is, therefore, a need for a new and improved apparatus for performing controlled penetration slitting.

In general, it is an object of the present invention to provide an apparatus for controlled penetration slitting which overcomes the above named disadvantage.

Another object of the invention is to provide apparatus of the above character which can be readily adjusted and operated.

Another object of the invention is to provide apparatus of the above character in which the penetration can be very precisely controlled.

Additional objects and features of the invention will appear from the following description in which the preferred embodiment is set forth in detail in conjunction with the accompanying drawings.

Referring to the drawings:

FIGURE 1 is a side elevational view of apparatus for controlled penetration slitting incorporating my invention.

FIGURE 2 is a top plan view of the apparatus shown in FIGURE 1.

FIGURE 3 is an enlarged cross-sectional view of a portion of the apparatus shown in FIGURE 1 and particularly shows the apparatus for performing controlled penetration slitting.

FIGURE 4 is a view looking along the line 4—4 of FIGURE 3.

FIGURE 5 is a cross-sectional view taken along the line 5—5 of FIGURE 3.

FIGURE 6 is a greatly enlarged side elevational view showing a controlled slitting operation.

FIGURE 7 is a front elevational view of the slitting operation shown in FIGURE 6.

In general, my apparatus for controlled penetration slitting consists of a framework, a feed table mounted on the framework and adapted to carry a pile of sheets upon which a controlled penetration slitting operation is to be performed, means for advancing the sheets of material one by one from the feed table, and means for cutting slits of controlled depth into the sheets during the time that the sheets are being advanced. This last named means consists of a pivotally mounted shaft. A holder is mounted on the shaft and carries a cutting blade which is adapted to be used for the controlled penetration slitting. Means is provided for precisely adjusting the angular rotational position of the shaft to thereby precisely position the blade.

As shown more particularly in the drawing, my apparatus for controlled penetration slitting consists of a frame 11 of the type disclosed in copending application Serial No. 857,993, filed December 7, 1959. A feed table 12 which is adapted to carry a plurality of sheets or forms on which the controlled penetration slitting operation is to be performed is mounted upon the framework 11. A feeding, pulling and cutting assembly 13 is mounted upon the framework 11 and is adapted to receive the sheets or forms from the feed table 12. After the sheets or forms are cut, slit or perforated, they are delivered to a lay boy or delivery table 14 also mounted upon the framework 11. The feed table 12, the feeding, pulling and cutting assembly 13 and the lay boy or delivery table 14 are very similar to the same parts disclosed in copending application Serial No. 857,993, filed December 7, 1959.

An assembly 16 for performing controlled penetration slitting is shown mounted upon the framework 11 immediately to the rear of the feeding, pulling and cutting assembly 13. This assembly is mounted upon the side plates 21 pivotally connected to the framework 11. A shaft 22 extends transversely of the side plates 21 and suitable means is provided to mount the shaft 22 so that it can be turned with great ease within a minimum of frictional restraint about its longitudinal axis. As shown particularly in FIGURE 3, this means includes bearing screws 23 which extend through holes (not shown) in side plates 21 and which are retained in the desired position with respect to the shaft 22 by a lock nut 24 on the left bearing screw 23 and by a lock washer 26 and an acorn nut 27 mounted on each bearing screw 23 outwardly of the respectively adjacent side plate 21. The bearing screws 23 are each provided with a recess adapted to receive a large ball bearing 28. The shaft 22 is provided with recesses on opposite ends to receive the ball bearings 28 so that the shaft 22 can be readily rotated about its longitudinal axis. It will be understood from the foregoing description and from FIG. 3 that the bearing screw 23 shown at the left in FIG. 3 may be selectively axially advanced or retracted with respect to the adjacent end of the shaft 22 thereby to vary selectively the degree of frictional engagement between the ball bearings 28 and the associated recesses into which they are received. When a selected condition is obtained, preferably one in which there is achieved a minimum of axial movement of the shaft 22 with a concomitant minimum degree of friction in the bearings of the shaft 22, the lock nut may be tightened down to retain the selected condition.

At least one, and preferably a plurality, of blade holders or slitters 31 are mounted upon the shaft 22. Each of the blade holders consists of a top member 32 and a bottom member 33. Both of the members 32 and 33 are provided with recesses adapted to receive the shaft 22 and are clamped to the shaft by suitable means such as cap screws 34 extending through member 32 and threaded into member 33. The cap screws 34 make it possible to adjust the holders 31 axially with respect to the shaft 22 to the desired position thereon. The lower member 33 is provided with a forwardly extending extension 33a which is partially U-shaped in configuration and which is adapted to extend into a slitting zone between rollers 36 and 37 forming a part of the feeding, pulling and cutting assembly 13. As shown particularly in FIGURE 5, the portion 33a is provided with a substantially semi-cylindrical recess 38 to accommodate the upper roller 36. The lower surface of the portion 33a is in relatively close proximity to the roller 37 and carries a cutting blade 39 which is clamped within a slot (not shown) in the holder by suitable means such as screws 41 extending into the holder 33. The cutting blade 39 can be formed of any suitable material such as a sharp razor blade, a cut diamond, as long as it is very sharp and will retain its sharpness for relatively long periods of time.

Means is provided for adjusting the outer extremity 33a of the holder with respect to the remainder of the holder 31 and includes a cap screw 42 which extends freely through the upper part 32 and which is threaded fixedly into the upper portion of the forward extremity 33a so that it can be utilized for providing a first adjustment for positioning the cutting blade 39. As shown in FIG. 5, there is threadably mounted upon the cap screw 42 a nut 43 which bears against the top surface of the member 32. Rotation of the nut 43 with respect to the screw 42 urges in a deforming movement the forward extremity 33a, which carries the cutting means 39, towards or away from (depending upon the direction of rotation of the nut 43) the roller 37. In order to facilitate deformation of the forward extremity 33a with respect to the restrained portion of member 33 mounted about the shaft 22, an upwardly extending slit 44 is provided in the member 33, as shown in FIG. 5, intermediate the shaft 22 and the screw 42. It is apparent from FIG. 5 that the distance between the root of the slit 44 and the cutting means 39 is substantially greater than the distance between the root of the slit 44 and the cap screw 42. Inherent in the configuration and arrangement of the lower holder member 33, as shown in FIG. 5, is that deformation or deflection of the forward extremity 33a will take place in the material proximate the root of the slit 44. Thus, it follows that the forward member 33a will deflect about an imaginary line perpendicular to the pictorial plane of FIG. 5 and arranged proximate the root of the slit 44. By reason of the location of the cap screw 42 with respect to said imaginary line, and the location of the cutting means 39 with respect thereto, a small axial movement of the screw 42 produces a substantially greater movement of the cutting means 39 with respect to the roller 37. The relationship between these movements is in substantially direct proportion to the ratio between the distance from the root of the slit 44 to the axis of the screw 42 and the distance from the root of the slit 44 to the cutting means 39. This arrangement provides the first or coarse adjustment of the cutting means 39.

Drive or pull rollers 45 with resilient annular members 45a are mounted upon the upper roller 36 between the slitters 31 for advancing the material to be slit through the slitters 35, as shown in FIGS. 4–7.

Means is provided for adjusting the angular position of the shaft 22 and the holders 31 carried thereby and consists of a micrometer 46 of a suitable type such as Lufkin No. 021V which is mounted in a right-angle bracket 47 secured to the side plate 21 by the associated bearing screw 23, the lock washer 26 and the nut 27. The bracket is provided with a hole 48 through which the micrometer extends. A slit 49 is provided in the bracket 47 which extends into the hole 48. A cap screw 51 is threaded into the bracket and through the slit 49 and is adapted to be adjusted to securely retain the micrometer 46 within the bracket 47.

An adjustment bracket 52 is securely clamped to the shaft 22 by suitable means such as the cap screw 53 which extends into the adjustment bracket and through a slit 54 in the bracket. By adjustment of this cap screw, the opening of the slit 54 and, therefore, the size of the opening 56, can be adjusted to rigidly secure the bracket 52 to the shaft 22.

Means is provided for yieldably urging the bracket 52 and the shaft 22 in a direction so that the bracket 52 is always in engagement with the micrometer 46 and consists of a compression spring 58 coaxially mounted upon a pin 59 which extends into the lower extremity of the adjustment bracket 52. The compression spring surrounds the pin and has one end seated in a well 61 provided in the adjustment bracket. The other end of the spring engages the bracket 47. It is apparent from FIG. 5 that axial advancement or retraction of the spindle shaft of the micrometer 46 causes the adjustment bracket 52 to turn the shaft 22 in the selected direction and thereby to pivot the cutting means 39 a corresponding degree about the axis of the shaft 22 to which the blade holder 31 is secured. To be observed from FIG. 5 is that the distance from the axis of the shaft 22 to the axis of the spindle shaft of the micrometer 46 is approximately equal to the distance from the axis of the shaft 22 to the operative portion of the cutting means 39. From this relationship it follows that a fine adjustment of the micrometer 46 produces a correspondingly fine adjustment of the cutting means 39.

Whisker-like members 66 of suitable material such as light spring steel are secured to holder 67 which are slidably mounted on the shaft 22 and adapted to be secured in a predetermined position by use of thumb screw 68.

Means, which includes an electric motor 70, is provided for driving the rollers 36 and 37 and is similar to that described in copending application Serial No. 857,993, filed December 7, 1959, and thus will not be described in detail.

Operation and use of my apparatus for controlled penetration slitting may now be briefly described as follows.

Let it be assumed that it is desired to perform a controlled penetration slitting on some signs or labels, or the like, identified as 71 in FIGURES 6 and 7, which are being made and which include releasable backing 73 applied to the signs or labels 72 which have a coating of pressure sensitive adhesive. The forms or strips, or the like, are first placed upon the feed table 12 and thence they are fed through the feeding, pulling and cutting assembly 13 in the manner described in copending application Serial No. 857,993, filed December 7, 1959, and in such a manner that they are advanced between the rollers 36 and 37.

Before the cutting operation is commenced, the shaft 22 with the holders 31 are carefully adjusted so that the blades 29 will cut precisely to the desired depth as, for example, to cut through the backs 73 and a portion of the adhesive but not through the label, sign or bumper strip 72 itself. The first adjustment is made by use of the cap screws 42 and nut 34 and to obtain roughly the desired positioning of the blades 39. After this has been accomplished, the position of the blades 39 can be finely adjusted by the micrometer 46 which can either urge the upper end of the adjustment bracket 52 clockwise as viewed in FIGURE 5 against the force of the spring 58, or permit the upper end to be moved counter-clockwise as viewed in FIGURE 5 by permitting the spring 58 to urge the lower extremity in a counter-clockwise direction against the micrometer 46.

After the apparatus has been properly adjusted, the forms 71 are fed through the machine to cause controlled penetration slitting to take place as shown in FIGURES 6 and 7 in which the blades 39 penetrate only through the back sheet 73 and through a portion of the adhesive (not shown) and not into or through the front sheet 72 as shown particularly in FIGURES 6 and 7.

By way of example, I have found that with my assembly for controlled penetration slitting, it is possible to adjust the penetration of the blade 39 to one-tenth of .001 of an inch. Thus, it can be seen that where an adhesive is .001 of an inch thick, it is possible to cut through the back sheet and then to cut through only a portion of the adhesive so that the back sheet can be readily split or slit so that it can be separated from the front sheet when desired.

The apparatus also has advantages in that it can be adjusted while the machine is operating. In addition, the micrometer is readily accessible so that the apparatus can be readily operated by a single person.

At the same time that the controlled penetration slitting is taking place, the forms can be cut, perforated, and other operations performed as described in copending application Serial No. 857,993, filed December 7, 1959. The whiskers 66 ensure that the forms or sheets, after they have passed through the feeding, pulling and cutting assembly 13 and the controlled penetration slitting assembly 16, will be deposited upon the delivery table 14.

It is apparent from the foregoing that I have provided a new and improved apparatus for controlled penetration slitting in which it is possible to precisely control the penetration and in which it can be readily and economically performed on a multiplicity of forms, bumper strips, and the like, and at the same time that other operations such as cutting and perforating are being performed.

I claim:

1. In apparatus for controlled penetration slitting of sheets, a framework, means including at least one roller mounted upon the framework and advancing the sheets so that the sheets pass over the roller, a shaft rotatably mounted in the framework and extending parallel to said roller, at least one holder mounted upon said shaft for adjustment longitudinally of the shaft, the holder having a cutting blade overlying the roller, and micrometer means for adjusting the angular position of the shaft relative to the framework to control the penetration of the blade held by the holder into the sheets as they are advanced over the roller.

2. Apparatus as in claim 1 wherein said holder is deformable and means mounted on said holder for deforming a portion of said holder to urge the cutting blade toward or away from the sheets as they are advanced to control the penetration of the cutting blade into the sheets.

3. In apparatus for controlled penetration slitting of sheets, a framwork, means mounted on said framework for advancing such sheets, a shaft rotatably mounted in the framework, a holder mounted on the shaft, said holder having a cutting blade mounted therein and means for precisely positioning said shaft and the holder carried thereby to move the cutting blade carried by the holder into engagement with such sheets as they are advanced to cause slits of a controlled depth to be formed in such sheets, said means for precisely positioning said shaft and the holder carried thereby including an adjustment bracket secured to said shaft, a bracket mounted on said framework, a micrometer mounted in said bracket secured to said framework and adapted to engage said adjustment bracket, and means yieldably urging the end of said adjustment bracket remote from the end engaged by said micrometer away from said bracket secured to said frame.

4. In apparatus for controlled penetration slitting of sheets, a framework, means including at least one roller mounted upon said framework for advancing such sheets, a shaft rotatably mounted in said framework and extending parallel to said roller, at least one holder mounted upon said shaft for adjustment longitudinally of said shaft, said holder having a cutting blade overlying said roller, a bracket secured to said frame, a micrometer secured to said bracket, an adjustment bracket secured to said shaft, a micrometer mounted in said bracket secured to said frame and adapted to be engaged by one end of said adjustment bracket, and yieldable means engaging the other end of said bracket and urging said one end of said adjustment bracket into engagement with said micrometer, thereby to adjust the angular position of said shaft relative to said framework to control the penetration of said blade held by said holder into such sheet as it is advanced.

5. In apparatus for controlled penetration slitting in sheets of laminated material, the combination comprising; a framework, means mounted on said framework for advancing such sheets with respect to a slitting zone; slitting means mounted on said framework for pivotal movement about an axis displaced from said zone; said slitting means including an operative slitting edge disposed remotely from said axis and projecting into said slitting zone; an adjustment member mounted on said framework and pivotable with said slitting means about said axis, said adjustment member extending from said axis at an angle with respect to said operative slitting edge; and fine adjustment means carried by said framework and arranged in cooperable engagement with said adjustment member at a location displaced from said axis a distance substantially equal to the distance between said axis and said operative slitting edge, said fine adjustment means serving to pivot said adjustment member about said axis a selected degree for moving said slitting edge an analogous distance with respect to such sheet in said slitting zone for enabling slits of controlled depth to be formed in such laminated sheets.

6. The combination defined in claim 5 wherein said slitting means includes coarse adjustment means comprising; a holder having a deflectable portion carrying said slitting edge and extending from a portion relatively rigid with respect thereto into said slitting zone, said holder having a weakening configuration intermediate said deflectable and said rigid portions; selectively movable means on said rigid portion operatively engaging said deflectable portion at a location intermediate said slitting edge and said configuration, said movable means serving to deflect said deflectable portion with respect to said rigid portion about said configuration for moving said slitting edge with respect to said slitting zone.

7. The combination defined in claim 6 wherein said selectively movable means engages said deflectable portion proximally of said configuration and distally of said slitting edge.

References Cited by the Examiner

UNITED STATES PATENTS

| | | | |
|---|---|---|---|
| 521,048 | 6/1894 | Ryan | 83—435 X |
| 1,465,966 | 8/1923 | Cameron et al. | 83—407 |
| 2,837,155 | 6/1958 | Cundiff et al. | 83—425 |
| 3,041,907 | 7/1962 | Gallagher | 83—582 |
| 3,165,951 | 1/1965 | Lindquist | 83—435 X |

WILLIAM W. DYER, JR., *Primary Examiner.*

ANDREW R. JUHASZ, *Examiner.*